(12) United States Patent
Xiao et al.

(10) Patent No.: US 8,464,292 B2
(45) Date of Patent: Jun. 11, 2013

(54) PERSONALIZED TELEVISION GUIDE

(75) Inventors: Hong (Jeff) Xiao, Acton, MA (US);
Andre R. Turner, Belmont, MA (US);
Dongchen Wang, Concord, MA (US);
Rahul Khushoo, Waltham, MA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 161 days.

(21) Appl. No.: 12/900,135

(22) Filed: Oct. 7, 2010

(65) Prior Publication Data

US 2012/0090007 A1    Apr. 12, 2012

(51) Int. Cl.
*H04N 5/445*    (2011.01)
(52) U.S. Cl.
USPC ................................. 725/46; 725/45; 725/47

(58) Field of Classification Search
USPC .................... 725/25, 42, 45–47, 44
See application file for complete search history.

(56) References Cited

U.S. PATENT DOCUMENTS

| | | | | |
|---|---|---|---|---|
| 7,856,646 | B1* | 12/2010 | Groff et al. | 725/42 |
| 2005/0097595 | A1* | 5/2005 | Lipsanen et al. | 725/25 |
| 2007/0250864 | A1* | 10/2007 | Diaz Perez | 725/52 |
| 2009/0106785 | A1* | 4/2009 | Pharn | 725/9 |
| 2011/0113441 | A1* | 5/2011 | Jeong et al. | 725/25 |

* cited by examiner

*Primary Examiner* — Kristine Kincaid
*Assistant Examiner* — Sumaiya A Chowdhury

(57) ABSTRACT

A system is configured to: receive identification information from a client device; identify a corresponding profile based on the identification information, where the corresponding profile is one of user profiles, device profiles, or generic profiles; generate a personalized television guide based on the corresponding profile, and transmit the personalized television guide to the client device.

14 Claims, 12 Drawing Sheets

PERSONALIZED TELEVISION GUIDE

BACKGROUND

Television content providers provide tools, such as television (TV) guides and searching functionality, that assist users in finding television content in which the users are interested. Currently, TV guides list channels sequentially, one by one in increasing numerical order. In other words, channels and television content are organized in existing TV guides in a standard way without regard to a specific user. As the number of channels and television programs continues to grow, users are required to expend an increasing amount of time and energy browsing TV guides to identify television programs that match their individual interests. Searching tools that may allow users to search through the programs listed in TV guides are cumbersome and unappealing to users.

BRIEF DESCRIPTION OF THE DRAWINGS

Figure 1A:
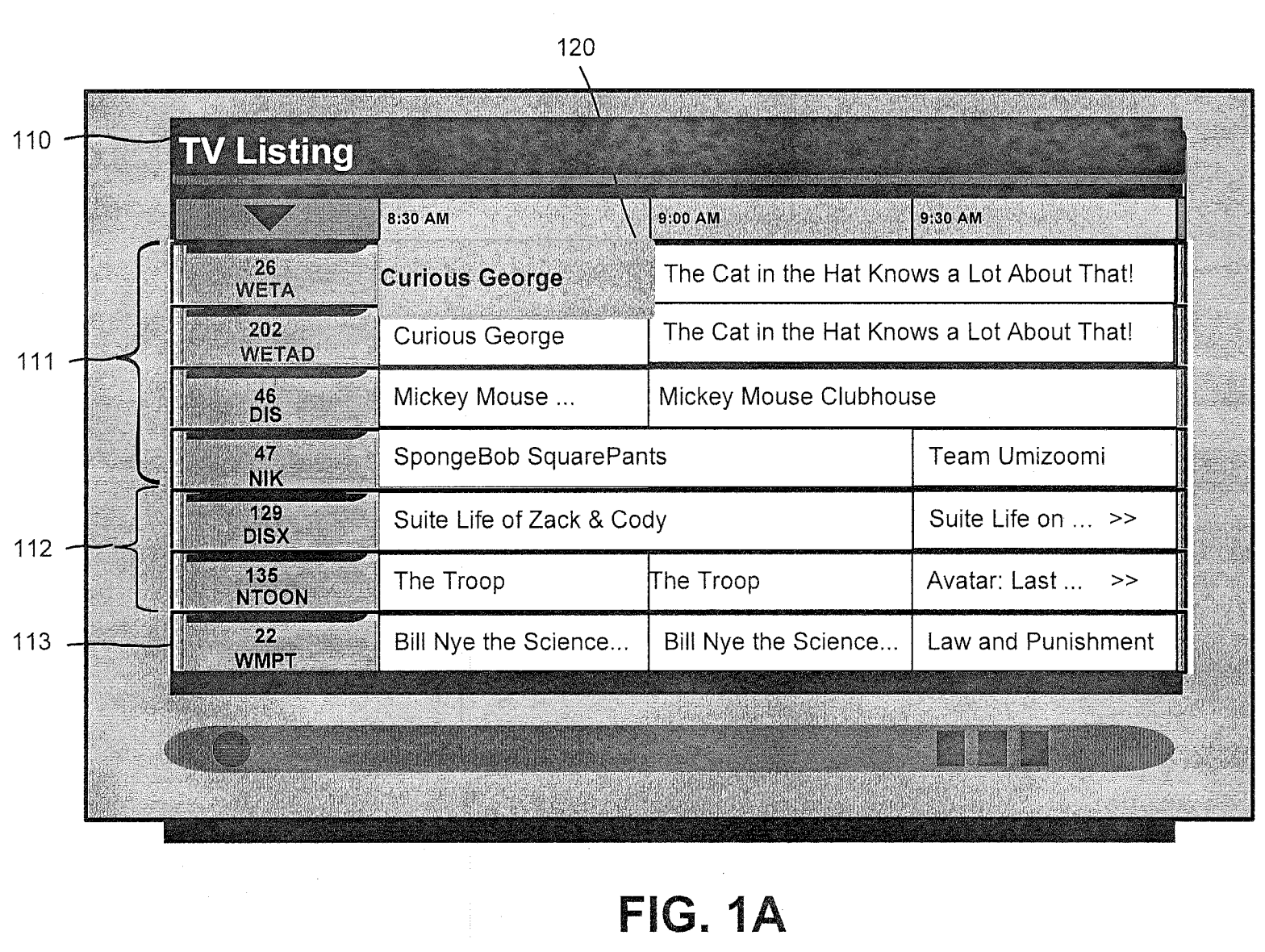

FIGS. 1A and 1B are diagrams that illustrate an overview of an implementation described herein;

DETAILED DESCRIPTION OF PREFERRED EMBODIMENTS

Figure 1B:
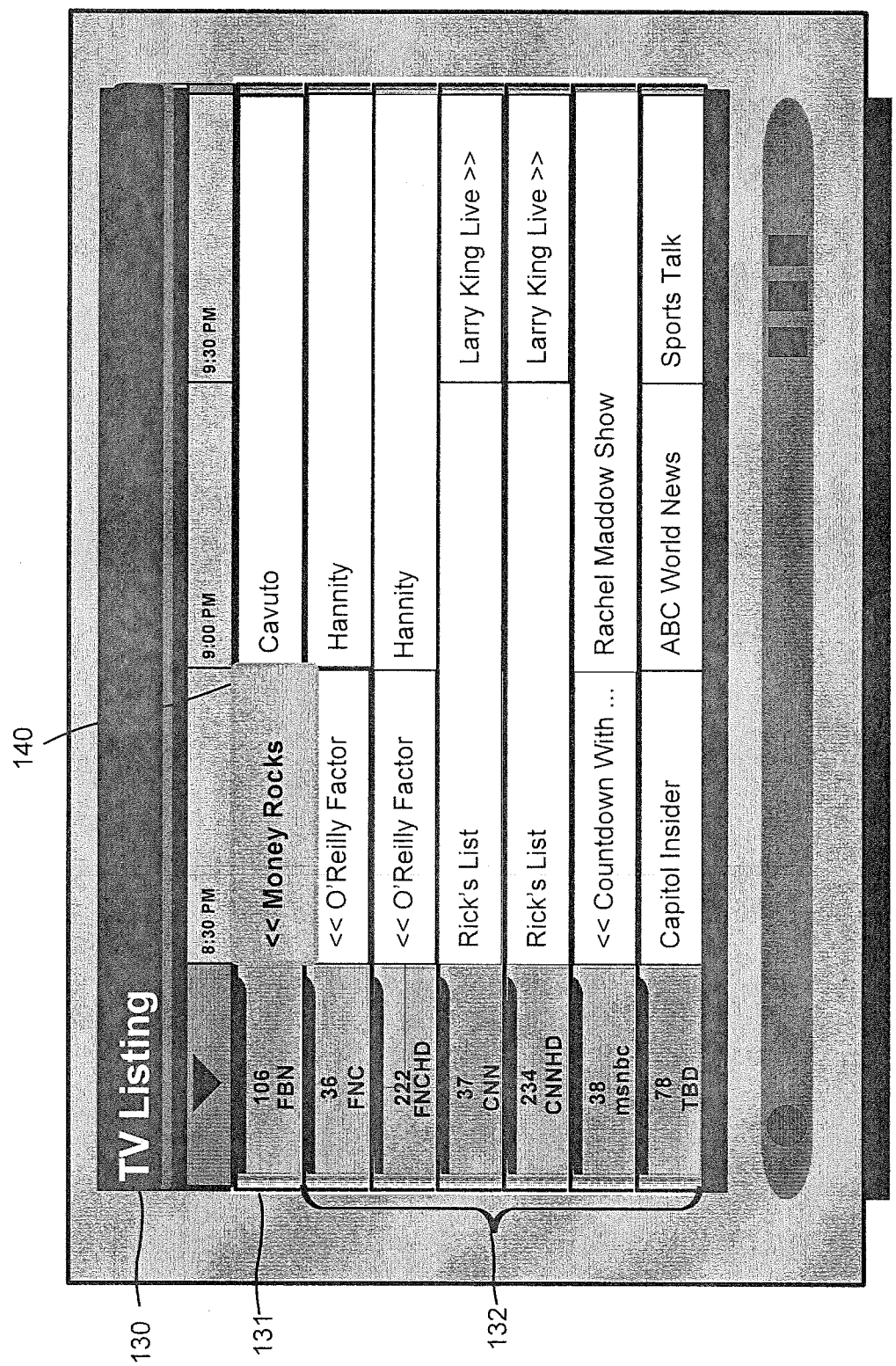

The following detailed description refers to the accompanying drawings. The same reference numbers in different drawings may identify the same or similar elements. Also, the following detailed description does not limit the invention.

An implementation described herein may provide personalized TV guides that are customized for individual users and are modified based on the users' behavior. A "TV guide" may refer to a user interface provided by a television content provider that lists different television content that may be available to a user. Examples of television content may include on-screen television listings (e.g., a list of scheduled television programs, the channels where the television programs may be displayed, and/or the corresponding broadcast time for each television program, etc.), DVR programming schedules, on demand service listings (e.g., video, games, music, etc.), music listings, game listings, etc. A user may select television content by scrolling/browsing to an area corresponding to a specific television content displayed in a TV guide and by selecting the area (e.g., by using a remote control).

A personalized TV guide may present listings of television content arranged based on a profile stored for an individual user, a client device (e.g., a set-top box (STB)), a residence, a defined group of people, etc. A server device (e.g., a computer system managed by a television content provider, in-home computer system, etc.) may update the profile based on user behavior of an entity (e.g., the individual user, users of the client device, users of all client devices within a residence, etc.) corresponding to the profile. As a result, listings of television content in a personalized TV guide corresponding to the profile may be presented in the future, based on the updated profile. User behavior may include information about one or more of the following factors: channels a viewer accesses (e.g., Cartoon Network, CNN, etc.), types of channels the viewer accesses (e.g., channels for children, news channels, music channels, etc.), genre/type of content the viewer accesses (e.g., animated cartoons, financial news shows, etc.), time period(s) when the viewer accesses certain content (e.g., news shows on weekends between 8:00 and 10:00 pm), length of television content the viewer accesses during a certain time period (e.g., 1 hour long shows on weekends between 8:00 and 10:00 pm), type of service providing television content (e.g., premium channels, free-content provider, on demand, Internet-based service provider, etc), resolution preference (e.g., HD, etc), information about a volume level selected or a volume change for television content accessed by the viewer, any combination of the aforementioned factors, or other factors relating to user behavior or preferences in relation to television content. Information may be collected regarding a user's behavior and/or preferences only with that user's express permission. Any reference to user behavior information may include information regarding preferences of a user, which may be implied from the user's activities or explicitly provided by the user.

FIGS. 1A and 1B are diagrams that illustrate an overview of an implementation described herein. FIG. 1A is a diagram that illustrates a personalized TV guide 110 customized based on a profile of a hypothetical individual user. In this example, assume that the individual user is a child. The child may watch the following types of television content between 8:00 a.m. and 10:00 a.m. (listed in descending frequency that the child watches the type of television content): animated cartoons, sitcoms aimed at children, and educational television shows aimed at children. A user profile may exist for the child. When the child watches television, a client device associated with the television may identify the child as the user. The client device may send user behavior information, including what type of television content the child watches, to a server device. The server device may update the user profile of the child based on the user behavior information.

The next time the child decides to watch a television, for example at 8:30 a.m., as shown in FIG. 1A, the client device associated with the television may display personalized TV guide 110 on the television based on the user profile of the child. Personalized TV guide 110 for the child may first include a listing of all animated cartoons 111 available at 8:30 a.m. because the child most frequently watches animated cartoons between 8:00 a.m. and 10:00 a.m. Furthermore, personalized TV guide 110 may include a listing of all sitcoms aimed at children 112 available at 8:30 a.m. after listing of animated cartoons 111 because the child second-most frequently watches sitcoms aimed at children between 8:00 a.m. and 10:00 a.m. Personalized TV guide 110 may also include a listing of an educational television show aimed at children 113 available at 8:30 a.m. after listing of all sitcoms aimed at children 112 because the child third-most frequently watches educational television shows aimed at children between 8:00 a.m. and 10:00 a.m.

After listings 111, 112, and 113, personalized TV guide 110 may include listing(s) of all other television content available at 8:30 a.m. (the listing of the other television content may be organized/restricted based on information in the user profile). The child may make a selection to watch "Curious George" 120—one of the animated cartoons in listing of animated cartoons 111—that is conveniently located on the top of the listings of personalized TV guide 110. The child does not have to browse through all of the television content available at 8:30 a.m. to make a selection to watch "Curious George" 120.

FIG. 1B is a diagram that illustrates a personalized TV guide 130 customized based on a profile of a hypothetical client device. For example, the client device may be associated with a television in a living room of a house. Users of the television may watch the following types of television content between 8:00 p.m. and 10:00 p.m. (listed in descending frequency that the type of television content is watched using the client device): financial news shows and other news shows. A device profile may exist for the client device. For example, one day a resident of the house may proceed to watch the television at 8:30 p.m. The resident may not provide to the client device any user identity information to identify himself (i.e., resident wants to remain anonymous) or a user profile may not exist for the resident.

Since a user profile cannot be identified for the resident, the client device associated with the television may display personalized TV guide 130 on the television based on the device profile of the client device. Personalized TV guide 130, based on the device profile, may include a listing of a financial news show 131 available at 8:30 p.m. followed by a listing of all available other news shows 132 also available at 8:30 p.m.

After listings 131 and 132, personalized TV guide 130 may include a listing of all other television content available at 8:30 p.m. (the listing of the other television content may be organized/restricted based on information in the device profile). The resident may make a selection to watch "Money Rocks" 140—the only financial news show available at 8:30 p.m.—that is conveniently located at the top of the listings of personalized TV guide 130. The resident does not have to browse through all of the television content available at 8:30 p.m. to make a selection to watch "Money Rocks" 140.

Figure 2:
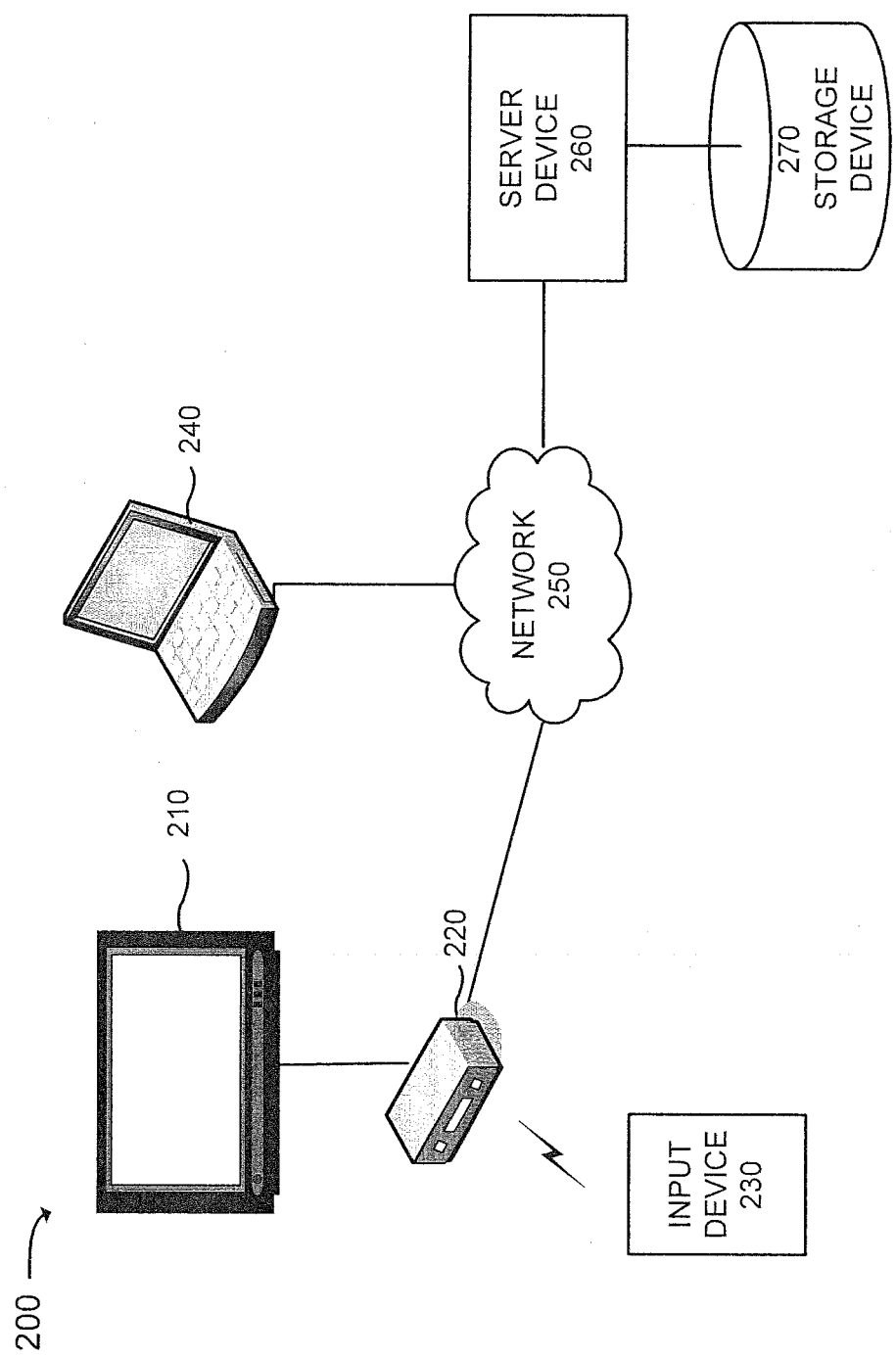
FIG. 2 is a diagram of an example environment in which systems and/or methods described herein may be implemented.

FIG. 2 is a diagram of an example environment 200 in which systems and/or methods described herein may be implemented. Environment 200 may include one or more of the following components: a video display device 210, a client device 220, an input device 230, a computer terminal 240, a network 250, a server device 260, and a storage device 270. In practice, environment 200 may include additional devices, fewer devices, different devices, or differently arranged devices than are shown in FIG. 2.

Also, two or more of the devices, of FIG. 2, may be implemented within a single device, or a single device may be implemented as multiple, distributed devices. Further, while FIG. 2 shows direct connections between some of the devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Video display device 210 may include any device capable of receiving and/or reproducing video and/or audio signals (e.g., any device capable of displaying television content). In one implementation, video display device 210 may take the form of a television. In another implementation, video display device 210 may include a computer monitor, a display of a communication device (e.g., a telephone, such as a VoIP telephone or a mobile telephone, or a PDA), or the like. Video display device 210 may be connected to client device 220 and may receive signals, from client device 220, containing television content for display.

Client device 220 may include any device that can receive and process data (e.g., television content, a TV guide, etc.) from server device 260. In one implementation, client device 220 may take the form of a STB. In another implementation, client device 220 may include a computer device, a cable card, a communication device (e.g., a telephone, such as a voice over Internet protocol (VoIP) telephone or a mobile telephone, or a personal digital assistant (PDA)), or the like.

Client device 220 may perform decoding and/or decryption functions on the data received from server device 260. Client device 220 may present the data on video display device 210. Video display device 210 and client device 220 may be part of a single device. Client device 220 may receive information from input device 230.

Input device 230 may include any device capable of transmitting information from a user to client device 220. In one implementation, input device 230 may take the form of a remote control device similar to a television or STB remote control device, a game controller, a keyboard, a keypad, a mouse, a PDA, a mobile telephone, or the like. Input device 230 may remotely control the operation of client device 220 and/or video display device 210. A user may enter user identity information (e.g., user name and password, user id and password, pass code (e.g., digital ID), user drawn pattern, etc.) and/or commands using input device 230. Input device 230 may provide user identity information and/or commands to client device 220 and/or video display device 210 by transmitting signals, such as wireless signals (e.g., infrared or Bluetooth) or signals transmitted over wires (e.g., over a universal serial bus (USB) interface or the like), to a receiver associated with client device 220 and/or video display device 210.

In another implementation, input device 230 may receive user identity information from an identifier (e.g., token, RFID tag, barcode, etc.) or a device (e.g., a laptop, a portable media player, a PDA, a mobile telephone, etc.) associated with a particular user. In another implementation, input device 230 may take the form of a biometric device. The biometric device may include a device (e.g., a camera, a laser scanner, a microphone, etc.) that may receive biometric information associated with a particular user (e.g., a retina scan, a voice signature, a facial signature, fingerprint, etc.). The biometric information may serve as user identity information for a user. Input device 230 may transmit the user identity information to client device 220. Input device 230 and client device 220 may be part of a single device.

Computer terminal 240 may include any device capable of allowing a person to interact with a user interface of a software application. In one implementation, computer terminal 240 may take the form of any computer, including a smart phone, a personal computer, a laptop, a handheld computer, a PDA, a mobile telephone device, a personal media player, etc. In another implementation, computer terminal 240 may serve as an input and output device that is connected to a remote computer system. Computer terminal 240 may be directly connected to client device 220 or through a network. In another implementation, the role of computer terminal 240 may be performed by video display device 210, client device 220, and/or input device 230. Computer terminal 240 may allow an administrator or a user to access an application provided by server device 260. Computer terminal 240 may allow the administrator or the user to manage a device profile of client device 220 or a user profile of the user of client device 220.

Network 250 may include a single network or multiple networks. For example, network 250 may include a video signaling and distribution network, such as a fiber optic network, to distribute information and/or television content from server device 260. Additionally, or alternatively, network 250 may take the form of a wide area network, a local area network, an intranet, or a telephone network (e.g., the Public Switched Telephone Network or a cellular network). In another example, network 250 may include a broadband and/or global network, such as the Internet.

Server device 260 may represent a single server device or a collection of multiple server devices and/or computer systems. In one implementation, server device 260 may be entirely located in a television provider's network. In another implementation, server device 260 may be at least partially co-located with client device 220 and/or video display device 210. For example, a portion of server device 260 that implements a personalized TV guide function may be co-located with client device 220 and/or video display device 210.

Server device 260 may receive television content from television content providers (e.g., free television broadcast providers, for-pay television broadcast providers, Internet-based content providers, etc.) and may include devices and systems that prepare data (e.g., stream of content) to transmit television content to client device 220 through network 250. Server device 260 may also include a device that may generate interactive content (e.g., personalized TV guides) to transmit to client device 220 through network 250. Server device 260 may process the data and interactive content for transmission, according a particular protocol, such as the asynchronous serial interface (ASI) format, to client device 220.

Server device 260 may also generate personalized TV guides based on applicable profiles. Server device 260 may receive user behavior information from client device 220 through network 250. Server device 260 may update profiles based on the user behavior information. Server device 260 may dynamically modify personalized TV guides displayed on video display device 210 by sending updated information to client device 220.

Server device 260 may include a guide engine. The guide engine may be a server, computer system, or a software component executed by a processor. The guide engine may track and record information related to a user's behavior relevant for each profile. The guide engine may calculate different weights for different types of content, different channels, lengths of television content, etc. based on the user behavior information. The guide engine may determine channel order in a personalized television guide when the server device 260 generates a personalized TV guide (or dynamically modifies a personalized TV guide).

Server device 260 may also provide access to an application for managing an account, including user and device profiles, to a person using computer terminal 240. The server(s) and/or computer system(s) of server device 260 related to handling profiles and generating personalized TV guides may be directly connected to client device 220 and/or computer terminal 240 or through a network. Server device 260 may store information about profiles in storage device 270.

Storage device 270 may include a device to write, read, and/or store information. For example, storage device 270 may store profiles for different users, devices, residences, etc.

Storage device 270 may receive updated user profile information from server device 260 that may enable server device 260 to track user behavior (e.g., viewing and/or recording habits) associated with the user(s) of client device 220. In another example, storage device 270 may store information that organizes various users' user behavior information based on demographic information provided about the users (e.g., in the users' user profiles). In one implementation, storage device 270 may be a part of server device 260. In another implementation, storage device 270 may connect to server device 260 through network 250.

Figure 3:
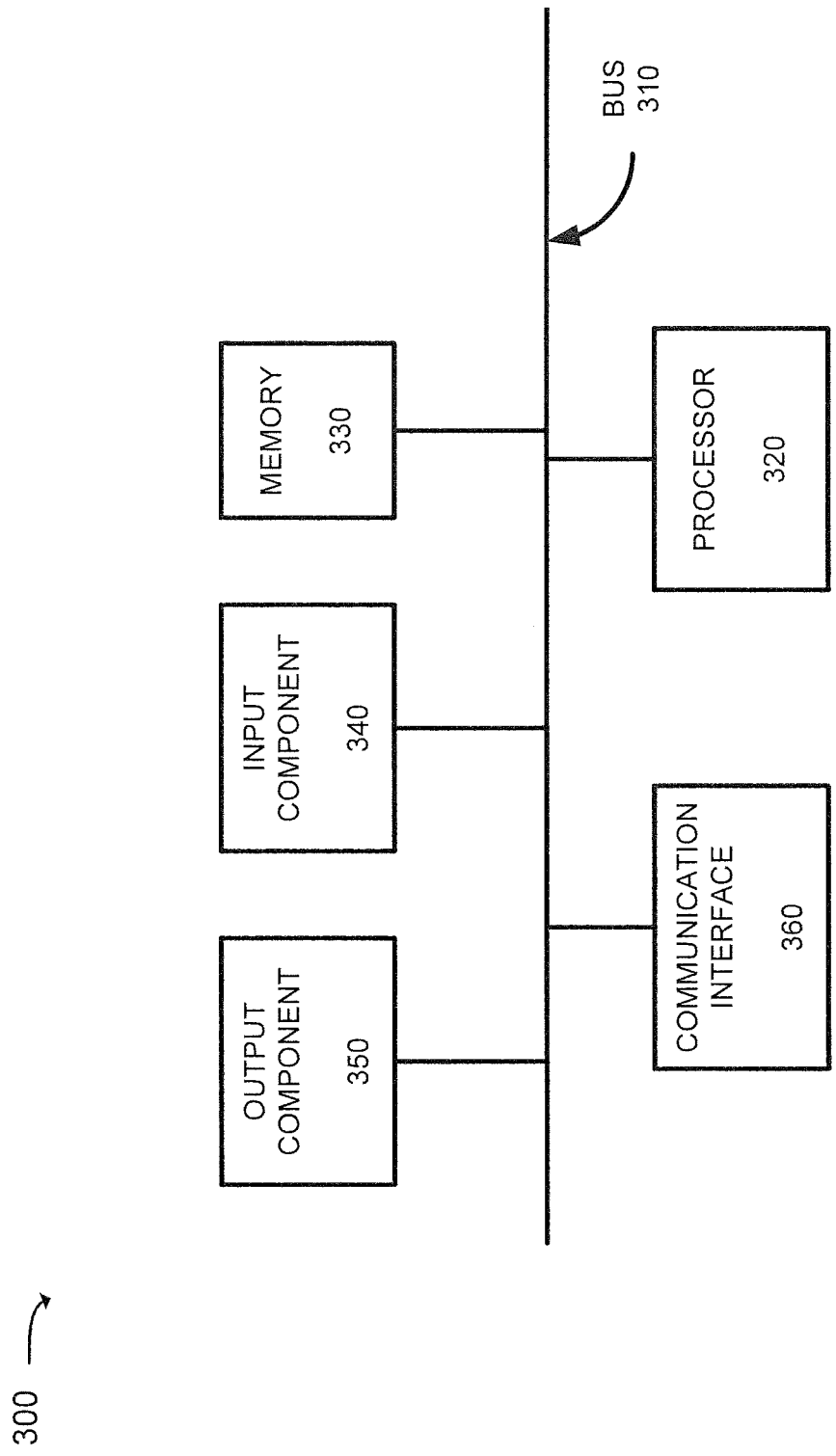
FIG. 3 is a diagram of example components of one or more of the devices of FIG. 2.

FIG. 3 is a diagram of example components of a device 300 that may be associated with video display device 210, client device 220, input device 230, computer terminal 240, server device 260, and/or storage device 270. Each of video display device 210, client device 220, input device 230, computer terminal 240, server device 260, and storage device 270 may include one or more devices 300.

As shown in FIG. 3, device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, a wireless interface, or the like.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.) or other forms of RAM or ROM. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
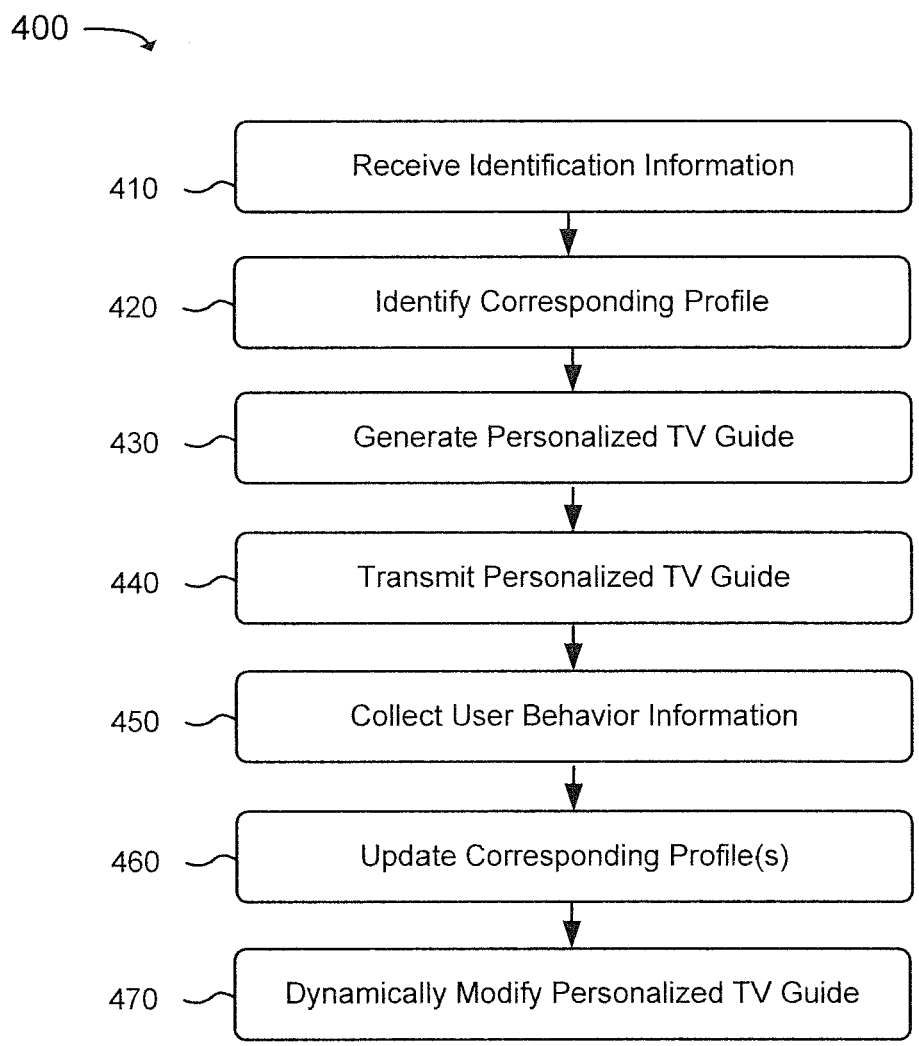
FIG. 4 is a flowchart of an example process for providing a personalized TV guide within an example portion of the environment of FIG. 2.

FIG. 4 is a flowchart of an example process 400 for providing a personalized TV guide within an example portion of environment 200. In one implementation, process 400 may be performed by server device 260. In another implementation, some or all of process 400 may be performed by a device or collection of devices separate from, or in combination with, server device 260.

Process 400 of FIG. 4 may include receiving identification information (block 410). For example, a user of client device 220 may decide to watch television content on video display device 210. Client device 220 may transmit identification information to server device 260. Server device 260 may receive the identification information from client device 220. The identification information may include user identity information identifying the user (e.g., user ID, user name and password, biometric information, etc), information identifying client device 220 (e.g., STB ID, etc.), information identifying a residence where client device 220 is located, and/or other identification information.

A corresponding profile may be identified (block 420). For example, server device 260 may receive identification information identifying a user, client device 220, and a residence where client device 220 is located. Server device 260 may identify a corresponding profile based on whether profiles exist for the user, client device 220, and/or the residence. If multiple profiles exist (e.g., a user profile corresponding to the user, a device profile corresponding to client device 220, and a generic profile corresponding to the residence), server device 260 may identify the corresponding profile that would allow the most personalized TV guide to be generated for the user. Block 420 will be described in greater detail below with reference to FIG. 5. A generic profile may be based on the combined television watching behavior of all users (using all the client devices) in a residence.

A personalized TV guide may be generated (block 430). Server device 260 may apply various algorithms and sorting methods to generate the personalized TV guide. For example, server device 260 may identify a user profile that corresponds to the user of client device 220. The user profile may include the user's demographic information and user behavior information. The user behavior information may include information about what type of television content the user watches (or records) during various time periods using various client devices (including client device 220). Server device 260 may generate the personalized TV guide for the user based on the user profile. The personalized TV guide may reflect the user behavior information. FIG. 1A, described above, provides an example of a personalized TV guide generated based on a user profile of a user. FIG. 1B, described above, provides an example of a personalized TV guide generated based on a device profile of client device 220.

Various algorithms may be used to calculate weights for different types of television content based on user behavior information. For example, a higher weight may be calculated for a type of television content that a user watches more frequently (e.g., animated cartoons, ½ hour long shows, etc.), according to a user's user profile, than for a type of television content that the user watches less frequently. A user may be permitted to set the manner in which various types of user behavior information is weighted. Sorting methods may use the weights to sort channels to be included in a personalized TV guide being generated. The sorting methods may include applying the weights to television content scheduled by the channels. The sorting may produce a ranking of the different channels. The ranking may determine the presentation of the different channels and/or television content within the personalized TV guide.

Server device 260 may also determine intelligent suggestions specifying what else the user might consider watching and targeted advertisements that the user might find interesting. Service device 260 may make the determinations based on the user profile of the user and information compiled for people with similar demographics and preferences as the user. Generating the personalized TV guide for the user may include adding the suggestions and/or the advertisements to the personalized TV guide.

The personalized TV guide may be transmitted (block 440). For example, server device 260 may transmit the personalized TV guide to client device 220 through network 250. Client device 220 may display the personalized TV guide on video display device 210.

User behavior information may be collected (block 450). For example, the child, described above with reference to FIG. 1, may begin to watch half-hour long television court shows (e.g., People's Court, Judge Mathis, etc.) between 8:00 a.m. and 10:00 a.m. The child may watch the television court shows most-frequently after animated cartoons. The child may no longer watch sitcoms and educational television shows between 8:00 a.m. and 10:00 a.m. Server device 260 may receive the information about the user behavior of the child from client device 220. A guide engine, of server device 260, may track and record the user behavior every time that the user of client device 220 selects television content from a (personalized) TV guide. Alternatively, client device 220 may compile the information about the user behavior of the user(s) of client device 220 and transmit the information at certain time intervals (e.g. once a day), after certain events (e.g., user finishes watching television content using client device 220, user records television content using client device 220, user spends at least a particular amount of time watching television content, or the like), etc. to server device 260.

Server device 260 may stop receiving user behavior information from client device 220 when a user who was using client device 220 leaves a room where client device 220 is located, turns off video display device 210, turns off client device 220, etc. For example, client device 220 and server device 260 may have initially identified the user and may have sent information to server device 260 about the user behavior of the user. Server device 260 may have used the user behavior information to update the user profile of the user. Client device 220 may determine that the user is no longer in the same room as client device 220, turns off video display device 210, turns off client device 220, etc. (and therefore is no longer watching video display device 210). As a result, client device 220 may stop sending user behavior information related to the operation of client device 220 and the television content being shown on video display device 210.

In another implementation, client device 220 may stop sending user behavior information to server device 260 when client device 220 determines that there is a new user in the room. The new user in the room may be in addition to the original user for who a personalized TV guide was most recently displayed by client device 220.

The corresponding profile(s) may be updated (block 460). For example, server device 260 may compile the user behavior information. Server device 260 may determine whether and what profiles need to be updated based on the collected user behavior information. For example, user behavior information, received about a user with an identified user profile using client device 220, may cause server device 260 to update the identified user profile, a device profile corresponding to client device 220, and/or a generic profile corresponding to a residence where client device 220 is located. A guide engine of server device 260 may calculate new weights for different types of content, different channels, lengths of television content, etc. based on the compiled information. Server device 260 may update the profiles based on the newly calculated weights.

In the example with the child referred to in the description of block 450 above, a guide engine of server device 260 may increase the weight of television court shows and decrease the weights of sitcoms and educational television shows for the time period between 8:00 a.m. and 10:00 a.m. Server device 260 may update the user profile corresponding to the child to reflect the recalculated weights. Personalized TV guide 110 (FIG. 1A) for 8:30 a.m., generated based on the updated user profile, may now include listing of animated cartoons 111 followed by a listing of all available half-hour long television court shows instead of listings 112 and 113.

A personalized TV guide may be dynamically modified (block 470). For example, server device 260 may modify a personalized TV guide that was previously generated for the user. Server device 260 may modify the personalized TV guide based on the updated profile. Server device 260 may dynamically modify the personalized TV guide by, for example, generating (block 430) and transmitting (block 440) a modified personalized TV guide to client device 220 when the user submits a request to use the personalized TV guide. In another implementation, server device 260 may generate (block 430) and transmit (block 440) a modified personalized TV guide to client device 220 at the end or beginning of every time period defined in the user profile of the user.

Figure 5:
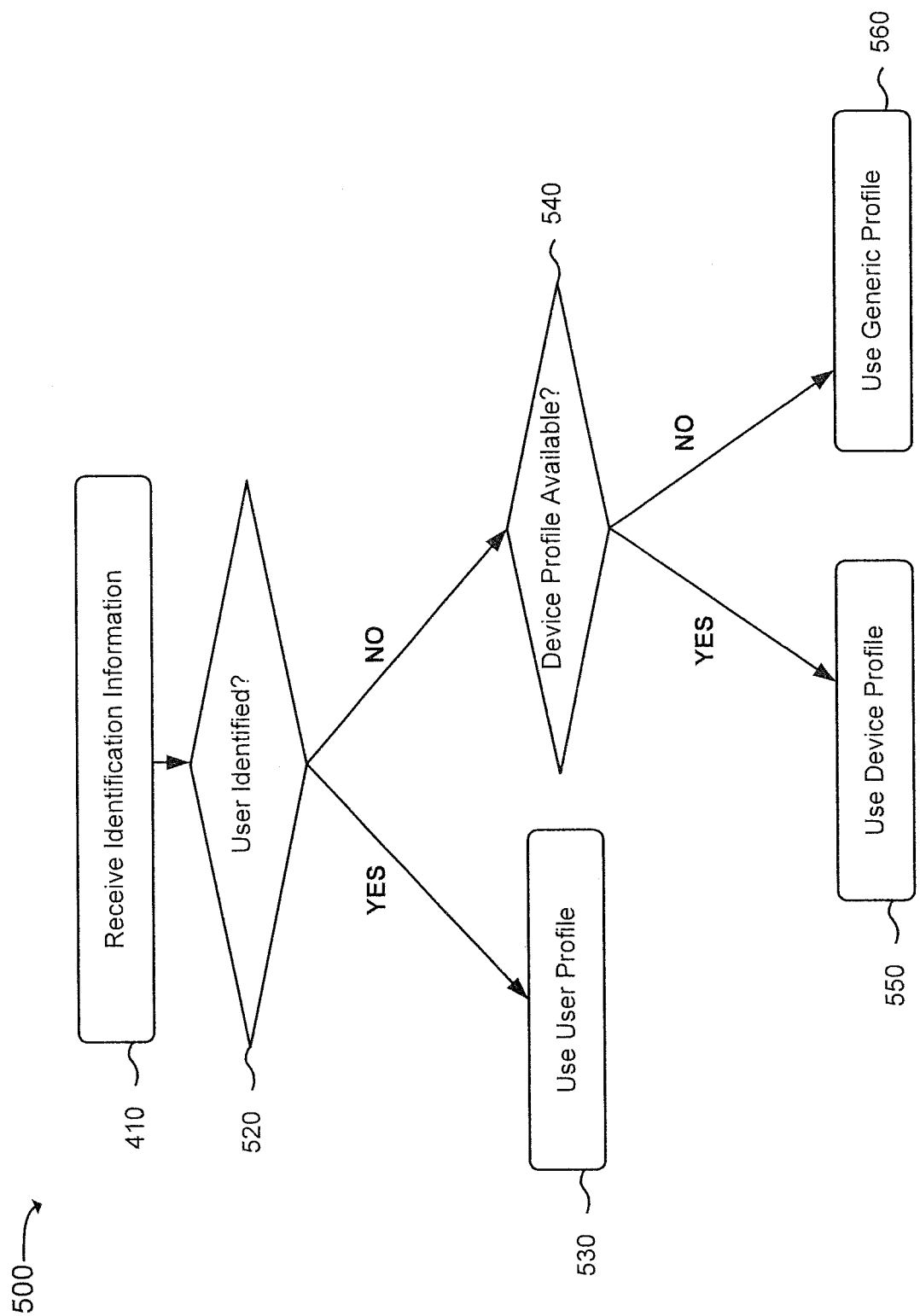
FIG. 5 is a flowchart of an example process for identifying a profile, consistent with an implementation of the example process depicted in FIG. 4.

FIG. 5 is a flowchart of an example process 500 for identifying a corresponding profile. Process 500 is consistent with an embodiment of process 400 depicted in FIG. 4. Block 410 of process 500 may correspond to block 410 of process 400, and blocks 520, 530, 540, 550, and 560 of process 500 may correspond to block 420 of process 400. In one implementation, process 500 may be performed by server device 260. In another implementation, some or all of process 500 may be performed by a device or collection of devices separate from, or in combination with, server device 260.

Process 500 of FIG. 5 may include receiving identification information (block 410). As discussed above, the description of block 410 of process 400 above applies to block 410 of process 500. Thereafter, server device 260 may determine whether a user can be identified based on the identification information (block 520). For example, a user may provide user identity information (e.g., user name/identifier, signal from tag/device associated with user (e.g., the user may be carrying an RFID tag or a mobile device), biometric information, etc.) to client device 220 via input device 230. In one implementation, client device 220 may determine the identity of the user based on the user identity information. Client device 220 may transmit an identifier (e.g., username/identifier, user ID, etc.) corresponding to the user to server device 260 as part of the identification information. In another implementation, client device 220 may provide the user identity information (e.g., user name, signal from identifier/device associated with user, biometric information, etc.) directly to server device 260 as part of the identification information. In either implementation, server device 260 may determine whether a user profile exists in storage device 270 corresponding to the user.

If a user profile corresponding to the user exists (block 520—YES), then the user profile may be used as the corresponding profile (block 530). If the server device 260 did not receive information to identify the user as part of the identification information or a user profile does not exist corresponding to the user (block 520—NO), then server device 260 may determine whether a device profile corresponding to client device 220 is available (block 540). The identification information received by server device 260 may include an identifier (e.g., STB ID) of client device 220. Server device 260 may use the identifier to determine whether a device profile, corresponding to the identifier, exists in storage device 270.

If a device profile corresponding to client device 220 exists (block 540—YES), then the device profile may be used as the corresponding profile (block 550). A device profile may correspond to an individual client device, like client device 220. The device profile may include information about client device 220 (e.g., location of client device 220, information about the users of client device 220, information about video display device 210 connected to client device 220, etc.) and information about the preferences/user behavior of users' who use client device 220.

If a device profile does not exist corresponding to client device 220 (block 540—NO), then a generic profile may be used as the corresponding profile (block 560). A generic profile may correspond to a defined location (e.g., residence, apartment, house, hotel room) or a defined group of client devices. The generic profile may include information about the client devices within the defined location/the defined group of client devices. The generic profile may also include information about the preferences/user behavior of all users' who use client devices within the defined location/the defined group. As discussed above, server device 260 may use the corresponding (user, device, or generic) profile to generate a personalized TV guide.

Figure 6:
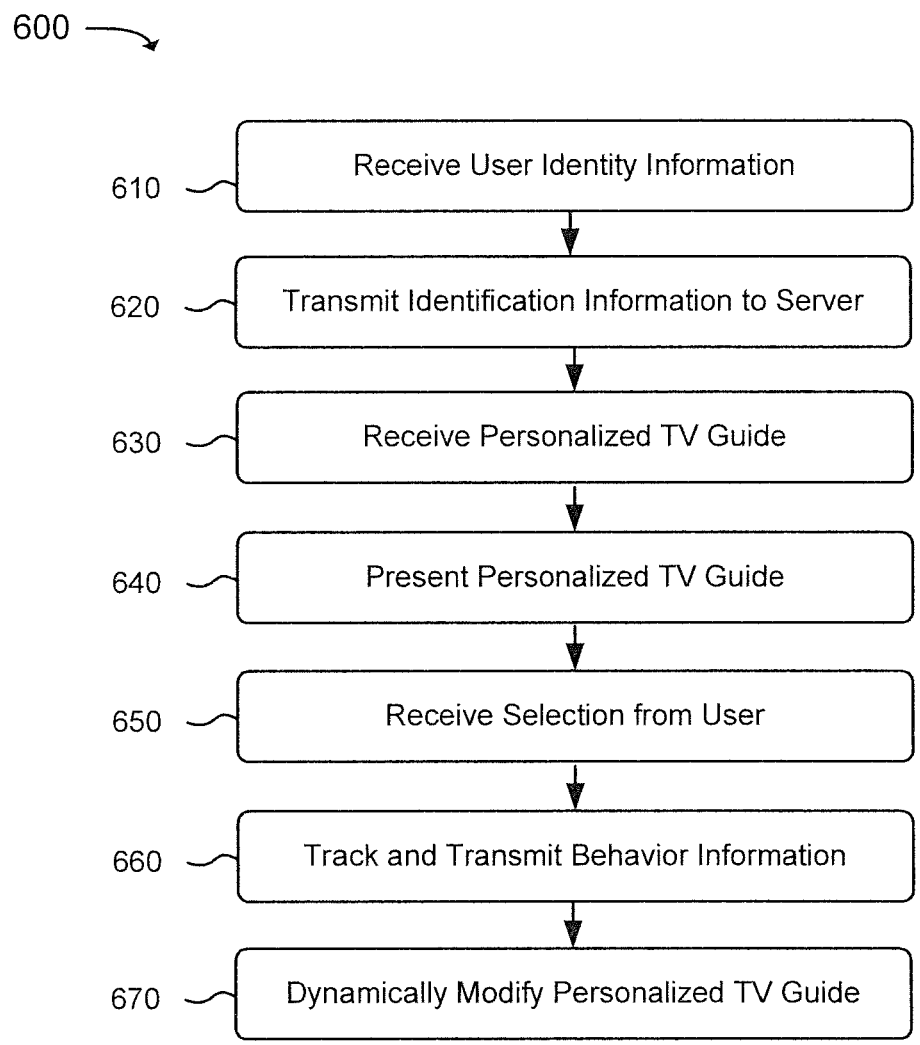
FIG. 6 is a flowchart of an example process for displaying a personalized TV guide within an example portion of the environment of FIG. 2.

FIG. 6 is a flowchart of an example process 600 for displaying a personalized TV guide within an example portion of environment 200. In one implementation, process 600 may be performed by client device 220. In another implementation, some or all of process 600 may be performed by a device or collection of devices separate from, or in combination with, client device 220.

Process 600 of FIG. 6 may include receiving user identity information (block 610). For example, a user may approach client device 220 or turn on client device 220 to watch television content on video display device 210. In response, client device 220 may obtain the user identity information of the user. In one implementation, input device 230 may independently determine the user identity information and transmit the user identity information to client device 220 (e.g., input device 230 may determine the user identity information device based on a signal from a cell-phone associated with a user). In another implementation, the user may input the user identity information into client device 220 (e.g., the user may need to enter a name and a password using input device 230). In another implementation, client device 220 or input device 230 may use biometric measures, such as facial recognition, to automatically generate the user identity information. In yet another implementation, a user may have multiple options for providing his user identity information. If client device 220 cannot automatically identify the user, then client device 220 may request that the user provide his user identity information.

Client device 220 may also receive user identity information about multiple users who are using client device 220 at the same time. In one implementation, client device 220 may isolate (i.e., only use/transmit to server device 260) the identity information of the user who is actually controlling client device 220 (e.g., the user who is using input device 230 to select television content). In another implementation, client device 220 may isolate the identity information of the user based on a predefined hierarchy of users (e.g., based on ranking of users in the residence). In another implementation, client device 220 may respond as though no user identity information was provided and treat the multiple users as a single anonymous user (e.g., a user who does not provide user identity information).

Identification information may be transmitted to server device 260 (block 620). Client device 220 may include, in the identification information, user identity information, an identifier of client device 220 (e.g., STB ID), and/or an identifier of a residence where client device 220 is located. If user identity information is not available (e.g., the user failed to provide the user identity information using input device 230), client device 220 may include, in the identification information, the identifier of client device 220 and/or the identifier of the residence where client device 220 is located.

A personalized TV guide may be received from server device 260 (block 630). As described above, server device 260 may generate the personalized TV guide based on a profile. Server device 260 may identify the profile based on identification information transmitted by client device 220 to server device 260.

The personalized TV guide may be presented to video display device 210 (block 640). Client device 220 may process data received from server device 260 to properly display the personalized TV guide on video display device 210. The personalized TV guide may be customized based on the user behavior information of the user, user(s) of client device 220, or user(s) of a group of client devices in a residence where client device 220 is located.

A selection may be received from a user (block 650). For example, a user may use input device 230 to make a selection of television content. A user may scroll/browse to an area in a personalized TV guide displayed on video display device 210. The area may correspond to a specific television content listed in the personalized TV guide (e.g., "Curious George" 120 in FIG. 1A). The user may make the selection by selecting the area. Client device 220 may transmit the selection information (i.e., a request for television content specified by the selection) to server device 260. In response, server device 260 may transmit or stream data corresponding to the television content to client device 220. Client device 220 may process the data and display the television content on video display device 210.

User behavior information may be tracked and transmitted with express user permission (block 660). When a user makes a selection, client device 220 may transmit the selection to server device 260 as user behavior information of the user. In another implementation, client device 220 may compile information about a user's or users' behavior and transmit the information to server device 260.

A personalized TV guide may be dynamically modified (block 670). In one implementation, when client device 220 receives a request from a user to use the personalized TV guide, client device 220 may send a request to server device 260 for an updated personalized TV guide. Server device 260 may update the personalized TV guide based on an updated profile corresponding to the personalized TV guide. Server device 260 may transmit the updated personalized TV guide to client device 220. In another implementation, server device 260 may generate and transmit an updated personalized TV guide to client device 220 at the end or beginning of a time period defined in the user profile of the user. Client device 220 may modify the personalized TV guide by presenting the updated personalized TV guide for display on video display device 210.

Figure 7:
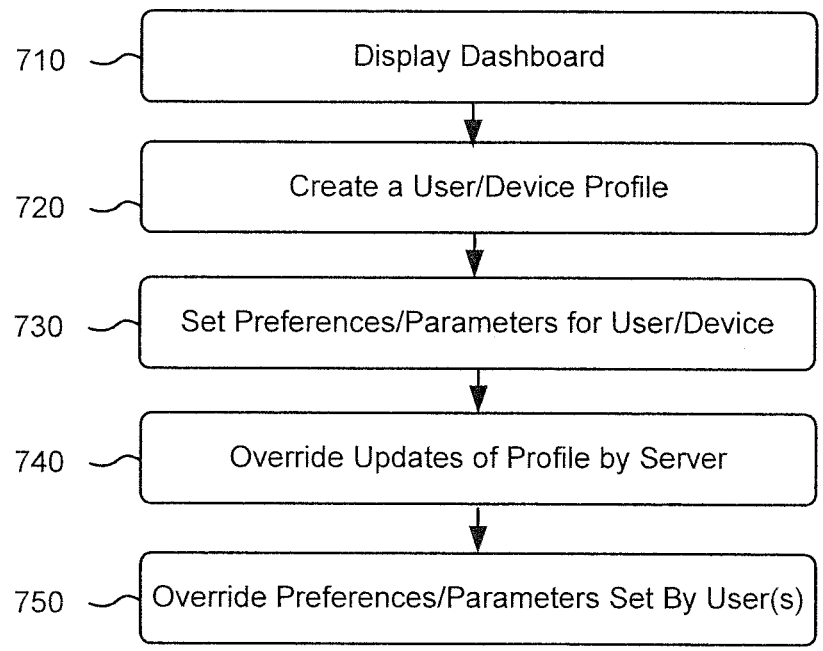
FIG. 7 is a flowchart of an example process for managing profiles within an example portion of the environment of FIG. 2.

FIG. 7 is a flowchart of an example process 700 for managing profiles within an example portion of environment 200. In one implementation, process 700 may be performed by computer terminal 240. In another implementation, some or all of process 400 may be performed by a device or collection of devices separate from, or in combination with, server device 240, such as client device 220 and video display device 210. A portion of process 700 will be discussed below with corresponding references to user interfaces 800, 900, and 1000 shown in FIGS. 8, 9, and 10, respectively.

Figure 8:
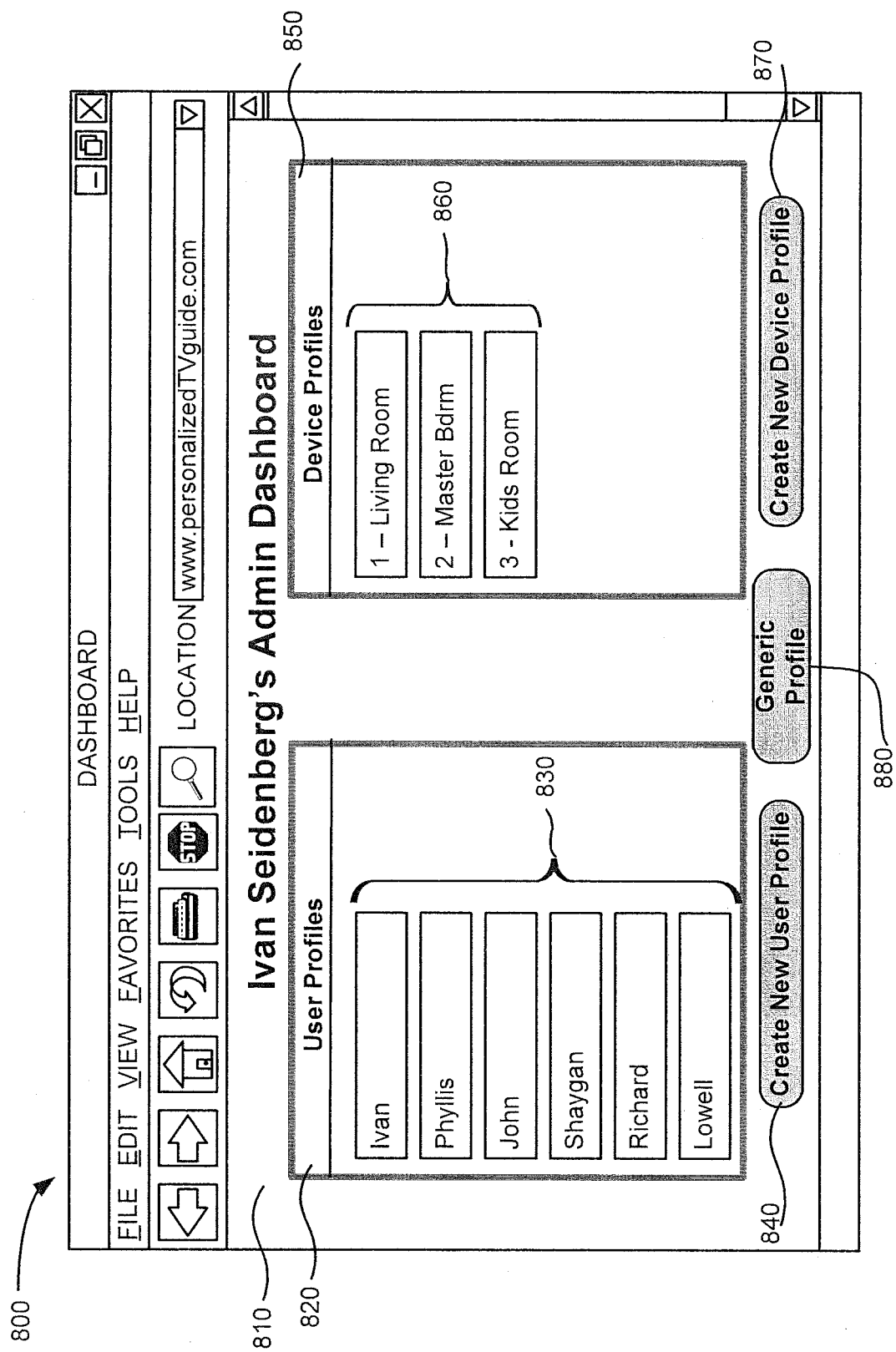
FIG. 8 is a diagram of an example dashboard user interface.

Process 700 of FIG. 4 may include displaying a dashboard (block 710). FIG. 8 is a diagram of an example dashboard user interface 800 that presents a dashboard 810. In one implementation, an administrator may use computer terminal 240 to open an internet browser. The administrator may use the browser to access user interface 800 provided by server device 260. The administrator may be provided with the ability to manage user and device profiles corresponding to a single residence through dashboard 810.

Dashboard 810 may present information to allow the administrator to manage the different profiles. Dashboard 810 may include a list 820 of user profiles 830 and a list 850 of device profiles 860 that the administrator may access through dashboard 810. An administrator may select one of the user profiles 830 or device profiles 860 to open a user interface showing a profile page for the selected profile. Dashboard 810 may also include a button to access a generic profile 880 that corresponds to the entire residence of the administrator. An example of a user interface showing a profile page for a user profile will be discussed in greater detail below with reference to FIG. 10.

Returning to FIG. 7, a user/device profile may be created (block 720). An administrator may use computer terminal 240 to access dashboard 810 illustrated in FIG. 8. Dashboard 810 may include a button to create a new user profile 840 and a button to create a new device profile 870. The administrator may press button 840 to open a user interface for creating a new user profile and press button 870 to open a user interface for creating a new device profile. An example of a user interface for creating a new user profile will be discussed in greater detail below with reference to FIG. 9.

Figure 9:
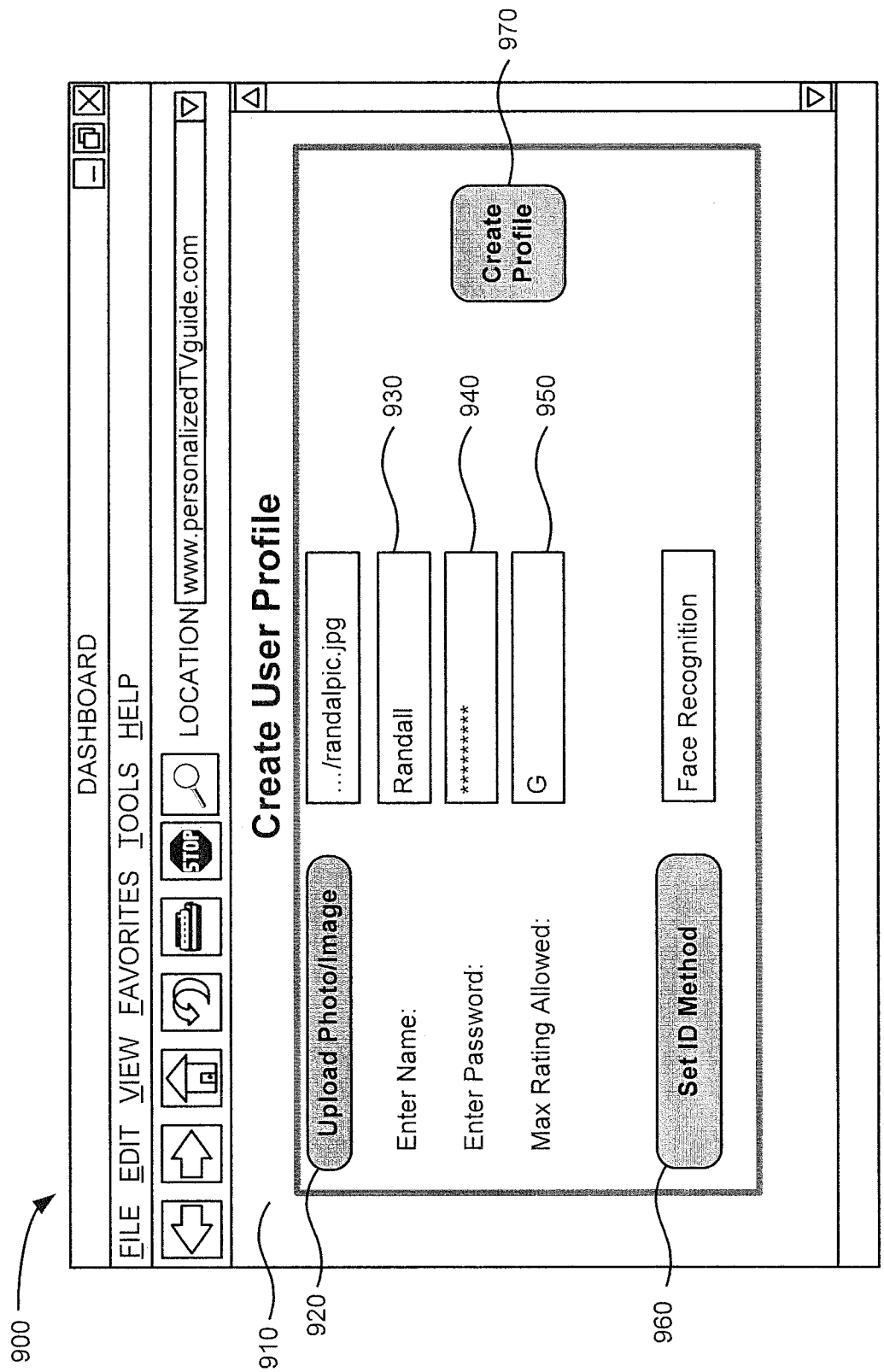
FIG. 9 is a diagram of an example user interface for creating a profile.

FIG. 9 is a diagram of an example of a user interface 900 for creating a profile (hereinafter referred to as "create profile user interface 900"). A screen of computer terminal 240 may display create profile user interface 900. Create profile user interface 900 may include a create user profile page 910 for providing information about a (potential) new user of client device 220. Create user profile page 910 may include one or more of the following elements to provide the information about the new user: an upload photo/image button 920, a name element 930, a password element 940, a max rating allowed element 950, and set additional ID method button 960.

An administrator may press upload photo/image button 920 to browse to a photo/image to represent the new user. A name of the selected file (e.g., randalpic.jpg) may be displayed next to upload photo/image button 920. Name element 930 and password element 940 may be text boxes. The administrator may enter a name (e.g., Randall) of the new user into name element 930. The administrator may enter a password for the new user into password element 940.

Max rating allowed element 950 may be a text box, a drop-down box, or a button to open a corresponding pop-up box. The administrator may use max rating allowed element 950 to select or enter a predefined rating (e.g., G) that represents the maximum rating of television content that the new user is allowed to watch. In one implementation, a personalized TV guide generated for the user may not list any television content that has a higher rating than the maximum rating specified. In another implementation, all of the television content with a rating below the maximum rating specified may be listed, in a personalized TV guide, before all of the other television content.

Set ID method button 960 may be used to define a method for the new user to provide user identity information to client device 220. For example, an administrator may want for user Randall to be identified based on Randall's biometric information. The administrator may press set ID method button 960. In response, a pop-up window (or a new page) may open for the administrator to specify an ID method for Randall.

When the window opens, the administrator may specify that he wants Randall identified based on his facial features. In one implementation, the administrator may upload a file that contains data for identifying Randall based on his facial features. In another implementation, the administrator may have Randall stand before an input device connected to computer terminal 240 that will input information about Randall's facial features. The inputted information may be used for Randall to be automatically recognized based on his facial features when using client device 220. The administrator may complete adding the ID method by closing the pop-up window. The name of the ID method (e.g., Facial Recognition) added for the new user may be displayed next to set ID method button 960.

In another example, an administrator may want Randall to be automatically identified when Randall uses client device 220 based on Randall's cell phone. The administrator may press set ID method button 960 and specify information about the cell phone. The information may allow input device 230 or client device 220 to detect the cell phone and for Randall to be identified as the user of client device 220.

While FIG. 9 illustrates create user profile page 910 that includes elements 920 through 960, in another implementation, create user profile page 910 may include fewer elements, additional elements, different elements, or differently arranged elements for providing information about a user than are described with respect to FIG. 9. For example, create user profile page 910 may also include one or more elements to provide demographic information (e.g., age, gender, etc.) about the user.

Create user profile page 910 may also include create profile button 970. After an administrator enters information about a new user using elements 920 through 960, the administrator may press create profile button 970 to create a new user profile for the new user. Thereafter, the name of the new user may be listed to represent the new user's profile along with user profiles 830 in list 820 of dashboard user interface 800.

While FIG. 9 illustrates an example user interface for creating a user profile, a similar user interface may be used for creating a device profile or a generic profile. For example, a device profile may be set for a client device. In one implementation, the device profile may be automatically created (e.g., by using a script) when an administrator/a user installs (e.g., sets-up, first turns on, etc.) a new client device, like client device 220, in a residence. In another implementation, an administrator/a user may manually create the device profile by using a create device profile page accessed by pressing button to create a new device profile 870. In either implementation, an identifier for the new device may be listed to represent the new device's profile along with device profiles 860 in list 850 of dashboard user interface 800. A generic profile may be similarly created.

Returning to FIG. 7, preferences/parameters may be set for a user/device (block 730). An administrator or a user using computer terminal 240 may access dashboard 810. The administrator may select any user profile 830 or device profile 860 to open a user interface showing a profile page for the selected profile. The administrator may use the profile page to set preferences/parameters for the profile corresponding to the profile page.

Figure 10:
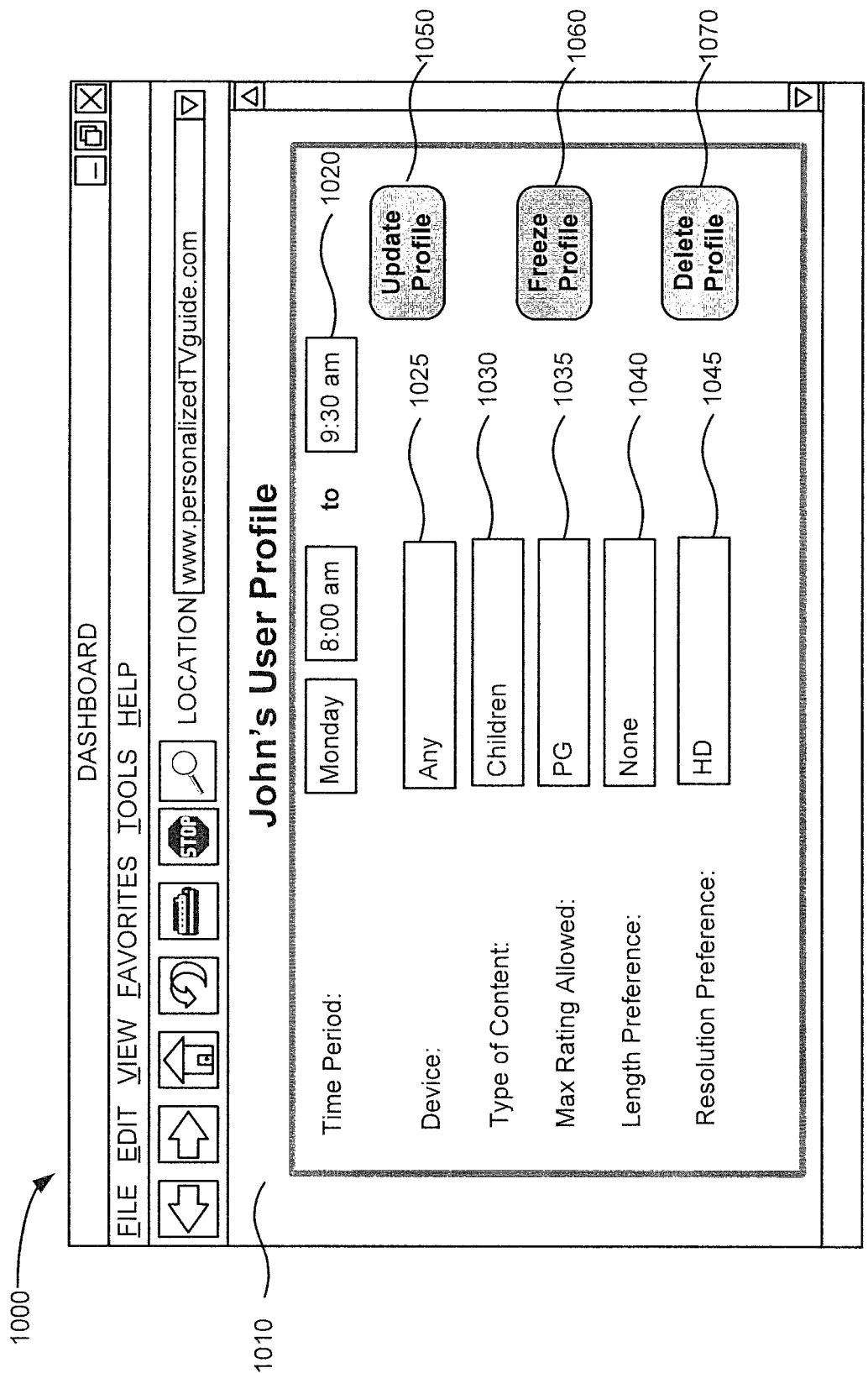
FIG. 10 is a diagram of an example user interface for managing an existing profile.

FIG. 10 is a diagram of an example user interface 1000 for managing an existing profile (hereinafter referred to as "profile page user interface 1000"). A screen of computer terminal 240 may display profile page user interface 1000. Profile page user interface 1000 with a profile page 1010 for user "John" may open when an administrator selects "John" from one of user profiles 830 shown on dashboard 810 in FIG. 8. Profile page 1010 may provide the ability to set television watching preferences/parameters for a user corresponding to the profile page by updating the profile of the user. Profile page 1010 may include one or more of the following elements to allow the setting of television watching preferences/parameters for the user: time period elements 1020, a device element 1025, a type of content element 1030, a maximum rating allowed element 1035, a length preference element 1040, and a resolution preference element 1045. Elements 1020 through 1045 may allow an administrator to enter values for each element by selecting a predefined choice from a drop-down box, pop-up box, etc.

In time period elements 1020, the administrator may specify a day of the week (e.g., Monday) or type of day (e.g., Weekend, Weekend, Holiday, etc.), a start time (e.g., 8:00 am), and an end time (e.g., 9:30 a.m.) for preference(s)/parameter(s) being set. Time period elements 1020 allow the administrator to define a time period. The preference(s)/parameter(s) set using elements 1025 through 1045 may apply only for the defined time period. In device element 1025, the administrator may specify what device(s) (e.g., Any, 1-Living Room, 1&2, etc.), within a residence, the preference(s)/parameter(s) are being set. The administrator may specify the device(s) using a unique identifier (e.g., STB ID) of each one of the device(s) or the name(s) of the device(s).

In type of content element 1030, the administrator may specify what kind of television content (e.g., Children, Financial News, Sports, etc.) should be provided greatest weight when generating a personalized TV guide for the user. In an alternative implementation, the administrator may specify multiple types of content (e.g., Sports; Action Movies; and Adventure TV Shows) or rank different types of content (e.g., 1: Animated Cartoons; 2: Sitcoms Aimed at Children; 3: Educational TV Shows Aimed at Children) in type of content element 1030. The administrator may also be able to indicate that no television content should be provided, restrict the type of content provided (e.g., No Adult Content, No Television Court Shows, etc.), exclude specific channels (e.g., No HBO), etc. in type of content element 1030. For example, an administrator who is a parent might indicate in a user profile page for his child that no "Adult Content" should be included in a personalized TV guide on "Any" day between 8:00 p.m. and 11:59 p.m. when the child is using the "3—Kids Room" client device.

In maximum rating allowed element 1035, an administrator may specify the maximum rating (e.g., PG, G, Any, etc.) of television content that may be included in the personalized TV guide for the user. In length preference element 1040, an administrator may specify the length of television content (e.g., Any, ½ hour, 30 mins, 1 hr, over 1 hr, etc.) that the user prefers to watch during the defined time period. In length preference element 1045, an administrator may specify the resolution quality (e.g., HD, minimum number of pixels per frame, etc.) that the user prefers to watch.

While FIG. 10 illustrates profile page 1010 for defining parameters/preferences that includes elements 1020 through 1045, in another implementation, profile page 1010 may include fewer elements, additional elements, different elements, or differently arranged elements for defining preferences/parameter than are described with respect to FIG. 10. For example, profile page 1010 may also include one or more elements to specify a preference for a type of service (e.g., premium channels (e.g., HBO), free content, on demand, etc.) for providing the television content.

Profile page 1010 may further include an update profile button 1050. An administrator may press update profile button 1050 to update a user profile of the user (e.g., "John") corresponding to profile page 1010 based on information entered into elements 1020 through 1045. Server device 260 may generate, in the future, a personalized TV guide for the user based on the updated profile. However, server device 260 may continue to receive user behavior information regarding the user. Server device 260 may update the profile of the user further based on the most recent user behavior information even if it varies from the preferences/parameters set by the administrator.

Profile page 1010 may also include a freeze profile button 1060. An administrator may press freeze profile button 1060 to permanently set a user profile of a user based on information entered into elements 1020 through 1045 until the administrator manually updates the user profile in the future. After freeze profile button 1060 is pressed, server device 260 may not update the user profile automatically based on received user behavior information. In another implementation, pressing freeze profile button 1060 may apply only to a limited number of preferences/parameters (e.g., only to maximum ratings allowed) and/or only to the preferences/parameters selected by the administrator.

Profile page 1010 may also include a delete profile button 1070. An administrator may press delete profile button 1070 to delete a user profile corresponding to profile page 1010. Thereafter, if a user (e.g., John), whose user profile is deleted, uses client device 220, server device 260 may not generate a personalized TV guide based on the user profile of the user. However, server device 260 may generate a personalized TV guide for the user based on a device profile of client device 220 when the user uses client device 220.

Returning to FIG. 7, updates of a profile by server device 260 may be overridden (block 740). As discussed above, server device 260 may update a user profile of a user based on received user behavior information corresponding to the user. After the update, server device 260 may generate/dynamically modify the personalized TV guide for the user based on the updated user profile of the user.

For example, an administrator may want to override the preferences/parameters automatically set by server device 260 in a user profile for user "John." The administrator may select John's user profile from user profiles 830 shown in FIG. 8. Profile page 1010, in FIG. 10, may open for the user profile of John. The administrator may select a time period using time period elements 1020. For example, the administrator may select the time period Monday, between 8:00 a.m. and 9:30 a.m. Server device 260 may send information to computer terminal 240 to automatically populate elements 1025 through 1045 based on the user profile of John for the selected time period. For example, type of content element 1030 may be filled in with "Television Court Shows" because John has been regularly watching television court shows on Mondays, between 8:00 a.m. and 9:30 a.m. The administrator may enter "Children" into type of content element 1030 to replace "Television Court Shows."

By pressing update profile button 1050, the administrator may override the preferences/parameters set in the user profile of John. The next time John proceeds to watch television (e.g., on video display device 210 by using client device 220) on a Monday, between 8:00 a.m. and 9:30 a.m., server device 260 may generate a personalized TV guide for John that lists all Children television content first instead of listing television court shows first. However, if John once again continues to select and watch mostly television court shows on Mondays, between 8:00 a.m. and 9:30 a.m., server device 260 may update the user profile of John to reflect this user behavior. Accordingly, server device 260 may generate a personalized TV guide for John based on the latest update of the user profile of John.

The administrator may also press freeze profile button 1060 after entering "Children" into type of content element 1030 to replace "Television Court Shows." Thereafter, server device 260 may not update the user profile of John for Mondays, between 8:00 a.m. and 9:30 a.m., regardless of John's user behavior. Accordingly, server device 260 may continue to generate a personalized TV guide for John listing all Children television content first even if John continues to mostly watch television court shows during the defined time period.

Preferences/parameters set by a user may be overridden (block 750). While blocks 710 through 740, in FIG. 7, were discussed above with reference to an administrator managing profiles, a user may also be provided with the ability to manage a profile. A user may access dashboard user interface 800 (block 710). The user may create a user profile or a device profile by pressing buttons 840 and 870, respectively (block 720). The user may provide the information using the create profile user interface 900 illustrated in FIG. 9. The user may also access their own user profile by selecting their own profile from one of user profiles 830. The user may also access one of the device profiles by selecting a device profile from one of device profiles 860. The user may set preferences/parameters for the selected profile (block 730) using profile page user interface 1000.

An administrator may be provided with the ability to determine what, if any, profile(s) a user may access. The administrator may also be provided with the ability to override the preferences/parameters set by the user. An administrator may access a profile for which the user set preferences/parameters by selecting the profile on dashboard 810. Profile page user interface 1000 may open for the selected profile. The administrator may select (define) a time period using time period elements 1020. Elements 1025 through 1045 may be filled based on preferences/parameters set by the user. The administrator may override the preferences/parameters set by the user by filling in different information into elements 1025 through 1045. The profile of the user/device may be updated based on the different preferences/parameters set by the administrator. In one implementation, the user may not be able to change any of the preferences/parameters that have already been set/changed by the administrator.

Figure 11:
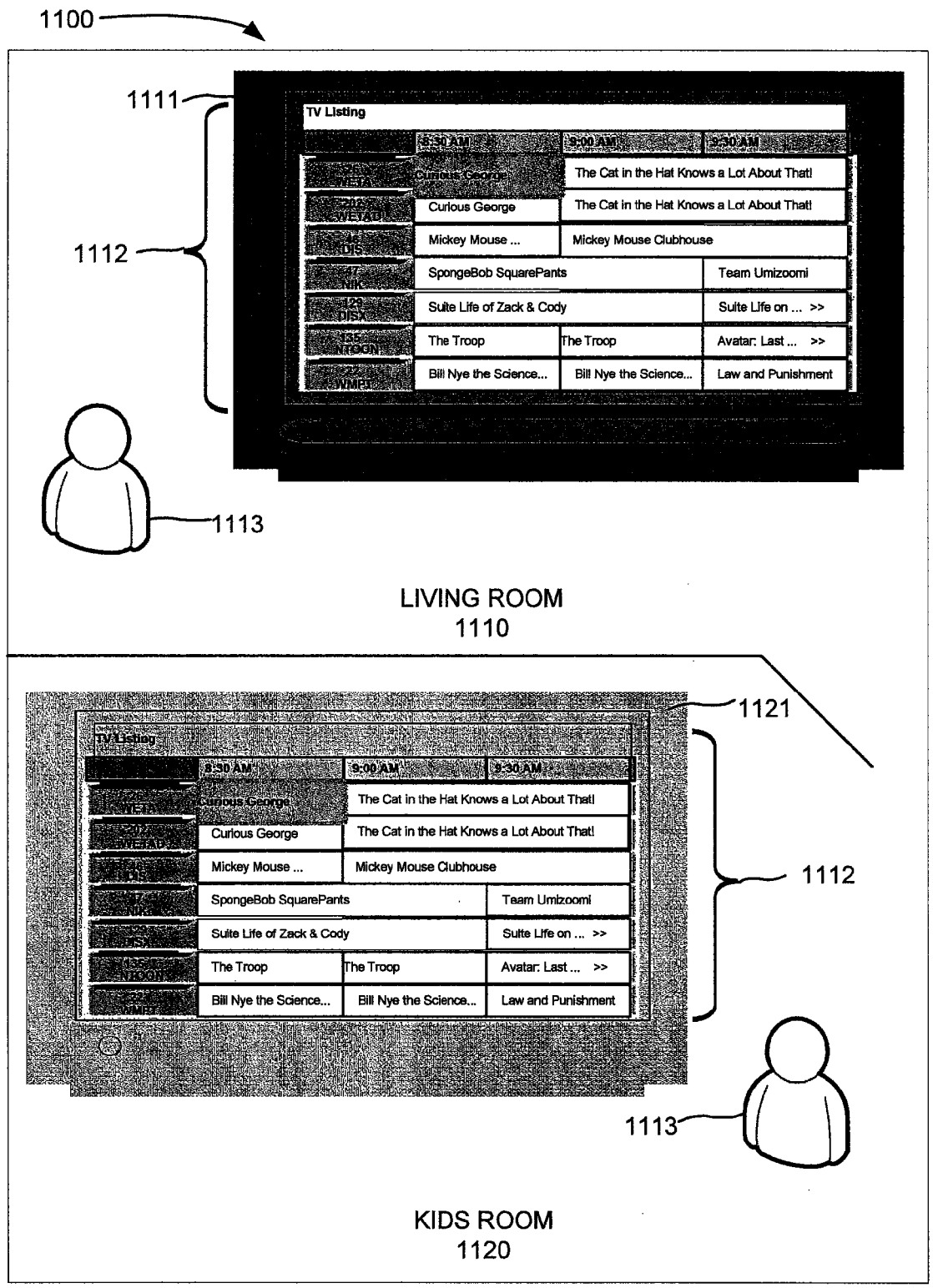
FIG. 11 is a diagram that illustrates an example of presenting a personalized TV guide to a user.

FIG. 11 is a diagram that illustrates an example of presenting a personalized TV guide 1112 to a user 1113 in a residence 1100. Residence 1100 may include a living room 1110 and a kids room 1120. Living room 1110 may include a television 1111 and kids room 1120 may include a television 1121. Each one of television 1111 and television 1121 may correspond to a combination of video display device 210, client device 220, and input device 230.

Assume that user 1113 decides to watch television in living room 1110 at 8:30 a.m. User 1113 may turn on or approach television 1111. Television 1111 may transmit information identifying user 1113 to server device 260. Server device 260 may generate a personalized TV guide 1112 for user 1113 for a time period beginning at 8:30 a.m. based on a user profile corresponding to user 1113. Server device 260 may transmit personalized TV guide 1112 to television 1111. Television 1111 may display personalized TV guide 1112 to user 1113 in living room 1110.

At 8:32 a.m., user 1113 may proceed to walk into kids room 1120. Television 1111 may recognize that user 1113 is no longer in living room 1110 and stop sending user behavior information to server device 260. For example, television 1111 may have automatically identified user 1113 (i.e., determined information identifying user 1113) based on (a signal received from) a mobile device/RFID tag associated with user 1113. When user 1113 left living room 1110, television 1111 may have stopped receiving signals from the mobile device/RFID tag associated with user 1113. As a result, television 1111 may recognize that user 1113 is no longer in living room 1110.

User 1113 may turn on or approach television 1121 in kids room 1120. Television 1121 may transmit information identifying user 1113 to server device 260. Server device 260 may transmit personalized TV guide 1112 to television 1121. Personalized TV guide 1112 may be generated for a time period beginning at 8:32 a.m. based on the user profile corresponding to user 1113. Television 1121 may display personalized TV guide 1112 to user 1113 in kids room 1120. As a result, personalized TV guide 1112, which was shown to user 1113 by television 1111, is the same personalized TV guide that is shown to user 1113 by television 1121 (i.e., personalized TV guide 1111 followed user 1113 in residence 1100 during a predefined period of time (e.g., TV guide listings shown during the time between 8:16-8:46 a.m.)).

Furthermore, in another implementation, user 1113 may proceed to go to a different location (e.g., a hotel in California) outside residence 1100 (e.g., a home in Virginia). The different location may have its own client device. User 1113 may proceed to use the different location's client device. The different location's client device may receive user identity information from user 1113. The different location's client device may transmit the user identity information to server device 260. Server device 260 may generate a personalized TV guide for the user based on a user profile of the user. The personalized TV guide is the same one that would have been generated if server device 260 received the user identity information from client device 220 within the residence. Server device 260 may transmit the personalized TV guide to the different location's client device. The different location's client device may display the personalized TV guide on a screen. As a result, the user may have access to the same personalized TV guide that he would have had inside residence 1100 during the same predefined period of time.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4-7, the order of the blocks may be modified in other implementations. Further, non-dependent blocks may be performed in parallel.

While certain user interfaces are shown with respect to FIGS. 8-10, these user interfaces may include fewer elements, additional elements, different elements, or differently arranged elements in other implementations.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server device, identification information;
   determining, by the server device, that the identification information specifies user identity information that identifies a user of a client device;
   identifying an existing user profile that corresponds to the user identity information, and is one of a plurality of user profiles indicative of preferences and parameters related to television content selection and presentation;
   identifying an existing device profile that corresponds to a client device identifier, specified in the identification information, that identifies the client device, and is one of a plurality of device profiles indicative of preferences and parameters related to television content selection and presentation;
   identifying which, of the existing user profile and the existing device profile, permits generation of a personalized television guide that is based on a greater number of the preferences and parameters related to television content selection and presentation;
   generating, by the server device, the personalized television guide based on the identified profile;
   transmitting the personalized television guide to be displayed to the user;
   receiving user behavior information of the user with respect to the transmitted personalized television guide;
   determining, based on the user behavior information, that at least one of the existing user profile or the existing device profile is to be updated; and
   updating the at least one of the existing user profile or the existing device profile based on the user behavior information.

2. The method of claim 1, further comprising:
   modifying the personalized television guide based on the updating of the existing user profile and the existing device profile.

3. The method of claim 1, wherein the user identity information comprises at least one of information identifying an RFID tag or a mobile device associated with the user.

4. The method of claim 1, where the identification information further comprises a residence identifier that identifies a location at which the client device is located.

5. The method of claim 4, wherein the method further comprises:

identifying a generic profile that corresponds to the residence identifier; and determining whether the generic profile permits generation of another personalized television guide that is based on a greater number of the preferences and parameters related to television content selection and presentation than the personalized television guide based on the identified profile.

6. A system comprising:

a memory to store at least user profiles, device profiles, and generic profiles indicative of preferences and parameters related to television content selection and presentation; and a processor, connected to the memory, configured to:
  receive, via a network, identification information including a user identifier and a client device identifier,
  determine that the user identifier identifies a user of a client device,
  identify, from the stored user profiles, an existing user profile that corresponds to the user identifier,
  identify, from the stored device profiles, an existing device profile that corresponds to the client device identifier,
  identify which, of the existing user profile and the existing device profile, permits generation of a customized television guide that is based on a greater number of the preferences and parameters related to television content selection and presentation,
  generate, based on the identified profile, the customized television guide,
  transmit the customized television guide to be displayed to the user,
  receive user behavior information of the user with respect to the transmitted customized television guide,
  determine, based on the user behavior information, that at least one of the existing user profile or the existing device profile is to be updated, and
  update the at least one of the existing user profile or the existing device profile based on the user behavior information.

7. The system of claim 6, wherein the user identity information comprises at least one of information identifying an RFID tag or a mobile device associated with the user.

8. The system of claim 6, wherein the identification information further comprises a residence identifier that identifies a location at which the client device is located, the processor further configured to:
  identify a generic profile that corresponds to the residence identifier, and
  determine whether the generic profile permits generation of another customized television guide that is based on a greater number of the preferences and parameters related to television content selection and presentation than the customized television guide based on the identified profile.

9. A non-transitory computer-readable storage device storing a program for causing a computer to perform a method, the method comprising:
  receiving, via a network, identification information including a user identifier and a client device identifier;
  determining that the user identifier identifies a user of a client device;
  identifying, from a plurality of user profiles indicative of preferences and parameters related to television content selection and presentation, an existing user profile that corresponds to the user identifier;
  identifying, from a plurality of device profiles indicative of preferences and parameters related to television content selection and presentation, an existing device profile that corresponds to the client device identifier;
  identifying which, of the existing user profile and the existing device profile, permits generation of a customized television guide that is based on a greater number of the preferences and parameters related to television content selection and presentation;
  generating, based on the identified profile, the customized television guide;
  transmitting the customized television guide to be displayed to the user;
  receiving user behavior information of the user with respect to the transmitted customized television guide;
  determining, based on the user behavior information, that at least one of the existing user profile or the existing device profile is to be updated; and
  updating the at least one of the existing user profile or the existing device profile based on the user behavior information.

10. The non-transitory computer-readable storage device of claim 9, wherein the user identity information comprises at least one of information identifying an RFID tag or a mobile device associated with the user.

11. The non-transitory computer-readable storage device of claim 9, wherein the identification information further comprises a residence identifier that identifies a location at which the client device is located, the method further comprising:
  identifying a generic profile that corresponds to the residence identifier; and
  determining whether the generic profile permits generation of another customized television guide that is based on a greater number of the preferences and parameters related to television content selection and presentation than the customized television guide based on the identified profile.

12. A network device comprising:
  one or processors to receive, via a network, identification information including a user identifier and a client device identifier;
  one or more processors to determine that the user identifier identifies a user of a client device;
  one or more processors to identify, from a plurality of user profiles indicative of preferences and parameters related to television content selection and presentation, an existing user profile that corresponds to the user identifier;
  one or more processors to identify, from a plurality of device profiles indicative of preferences and parameters related to television content selection and presentation, an existing device profile that corresponds to the client device identifier;
  one or more processors to identify which, of the existing user profile and the existing device profile, permits generation of a customized television guide that is based on a greater number of the preferences and parameters related to television content selection and presentation;
  one or more processors to generate, based on the identified profile, the customized television guide;
  one or more processors to transmit the customized television guide to be displayed to the user;
  one or more processors to receive user behavior information of the user with respect to the transmitted customized television guide;

one or more processors to determine, based on the user behavior information, that at least one of the existing user profile or the existing device profile is to be updated; and one or more processors to update the at least one of the existing user profile or the existing device profile based on the user behavior information.

13. The network device of claim 12, wherein the user identity information comprises at least one of information identifying an RFID tag or a mobile device associated with the user.

14. The network device of claim 12, wherein the identification information further comprises a residence identifier that identifies a location at which the client device is located, the network device further comprising:

one or more processors to identify a generic profile that corresponds to the residence identifier; and one or more processors to determine whether the generic profile permits generation of another customized television guide that is based on a greater number of the preferences and parameters related to television content selection and presentation than the customized television guide based on the identified profile.

* * * * *